US012560689B2

(12) United States Patent
Strepp

(10) Patent No.: US 12,560,689 B2
(45) Date of Patent: Feb. 24, 2026

(54) OPTOELECTRONIC DEVICE AND METHOD FOR DISTANCE MEASUREMENT

(71) Applicant: SICK AG, Waldkirch (DE)

(72) Inventor: Wolfram Strepp, Waldkirch (DE)

(73) Assignee: SICK AG, Waldkirch (DE)

( * ) Notice: Subject to any disclaimer, the term of this patent is extended or adjusted under 35 U.S.C. 154(b) by 1028 days.

(21) Appl. No.: 17/686,697

(22) Filed: Mar. 4, 2022

(65) Prior Publication Data

US 2022/0291362 A1 Sep. 15, 2022

(30) Foreign Application Priority Data

Mar. 10, 2021 (EP) .................................... 21161717

(51) Int. Cl.
$G01S\ 7/4915$ (2020.01)
$G01S\ 7/4911$ (2020.01)
$G01S\ 17/894$ (2020.01)

(52) U.S. Cl.
CPC ........... $G01S\ 7/4915$ (2013.01); $G01S\ 7/4911$ (2013.01); $G01S\ 17/894$ (2020.01)

(58) Field of Classification Search
None
See application file for complete search history.

(56) References Cited

U.S. PATENT DOCUMENTS

| | | | | |
|---|---|---|---|---|
| 2011/0188028 A1* | 8/2011 | Hui | .......................... | G01S 17/36 |
| | | | | 356/5.01 |
| 2014/0049767 A1 | 2/2014 | Benedetti et al. | | |
| 2017/0343652 A1* | 11/2017 | de Mersseman | ..... | G01S 7/4912 |
| 2018/0210070 A1 | 7/2018 | Bleyer et al. | | |

FOREIGN PATENT DOCUMENTS

| | | |
|---|---|---|
| CN | 109901181 A | 6/2019 |
| EP | 3627184 A1 | 3/2020 |
| EP | 3736601 A1 | 11/2020 |
| WO | 2017205170 A1 | 11/2017 |

OTHER PUBLICATIONS

European Search Report dated Jul. 19, 2020 corresponding to application No. 21161717.0-1206.

* cited by examiner

*Primary Examiner* — Luke D Ratcliffe
(74) *Attorney, Agent, or Firm* — Nath, Goldberg & Meyer; Jerald L. Meyer

(57) ABSTRACT

An optoelectronic device for distance measurement in a detection zone using a phase based time of light method is provided that has a transmitter device for transmitting a light signal that is modulated by at least one first modulation frequency $f_1$, a reception device having at least one light reception element for generating a received signal from the light signal reflected back in the detection zone, and a control and evaluation unit that is configured to determine a phase offset between the transmitted light signal and the light signal reflected back and to determine a time of flight therefrom, and to evaluate a first amplitude determined from the received signal to determine an erroneous measurement by reflection of the light signal at an object in the detection zone outside an unambiguity range of the phase based time of light method.

19 Claims, 6 Drawing Sheets

Figure 1:
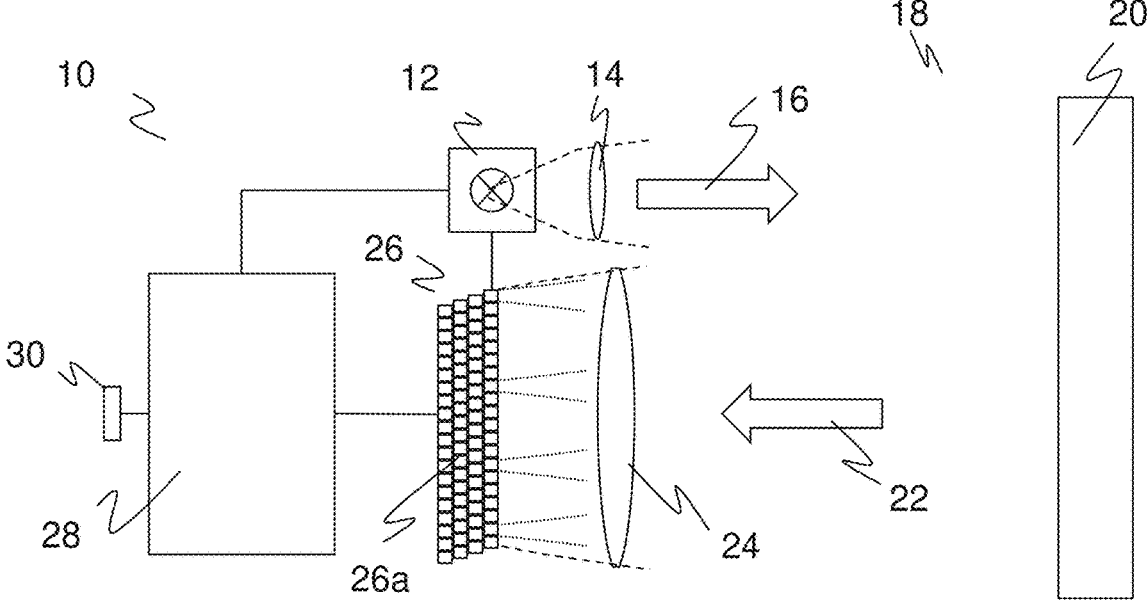

Fig. 5a                Fig. 5b                Fig. 5c
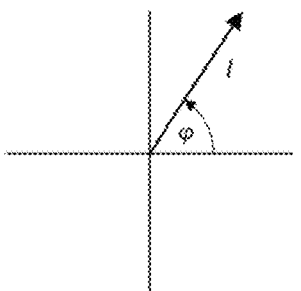 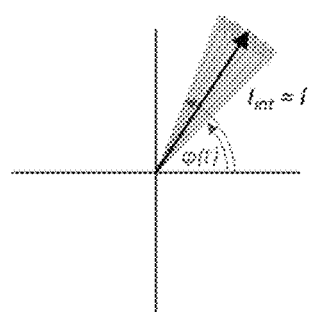 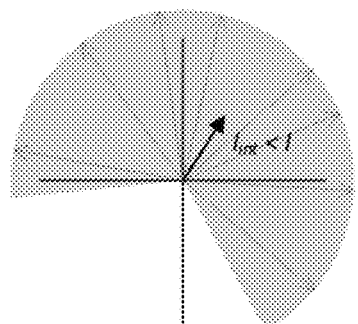
Fig. 6
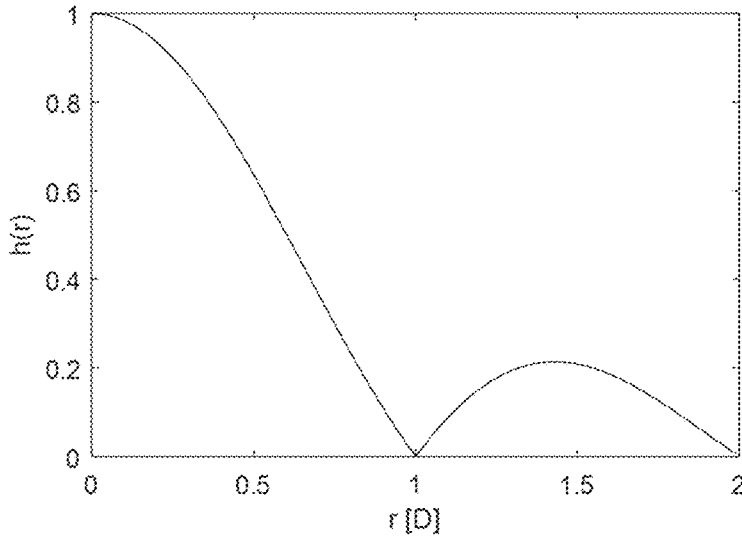

OPTOELECTRONIC DEVICE AND METHOD FOR DISTANCE MEASUREMENT

The invention relates to an optoelectronic device and to a method for distance measurement in a detection zone using a phase based time of flight method.

In a time of flight measurement, a light signal is transmitted and the light signal reflected back from the object is received again. The elapsed time therebetween is proportional to the object distance and can be converted using the speed of light. This type of distance measurement is also called TOF (time of flight) or LIDAR (light detection and ranging). The sensors that work with this principle include distance measurement devices and laser scanners. A 3D time of flight camera in this manner acquires depth information with its respective pixels. The detected three-dimensional image data having spacing values or distance values for the individual pixels are also called a 3D image, a distance image, or a depth map. Highly integrated TOF image sensors are available for this.

The additional distance dimension can be utilized in a number of applications to obtain more information on objects in the scene detected by the camera and thus to satisfy different objects. In automation technology, objects for example can be detected and classified with respect to three-dimensional image data in order to make further automatic processing steps dependent on which objects were recognized, preferably including their positions and orientations. The control of robots or different types of actuators at a conveyor belt can thus be assisted, for example.

In vehicles that operate on public roads or in a closed environment, especially in the field of factory and logistics automation, the total environment and in particular a planned travel path should be detected as completely as possible and in three dimensions using a 3D camera. This applies to practically all conceivable vehicles, whether those with operators such as passenger vehicles, trucks, work machines and fork-lift trucks or driverless vehicles such as AGVs (automated guided vehicles), AGCs (automated guided carts). AMRs (autonomous mobile robots) or floor-level conveyors. The image data are used to enable autonomous navigation or to assist an operator to inter alia recognize obstacles, to avoid collisions, or to facilitate the loading and unloading of transport products including cardboard boxes, pallets, containers, or trailers.

In safety engineering, the 3D camera detects persons in the environment of a hazard site, for example of a machine or especially of a robot. On recognition of an unpermitted intrusion into a protected volume or on a falling below of a safety distance from the machine, a safety related response takes place to avoid an accident. Sensors used in safety technology have to work particularly reliably and must therefore satisfy high safety demands, for example the EN13849 standard for safety of machinery and the machinery standard IEC61496 or EN61496 for electrosensitive protective equipment (ESPE). To satisfy these safety standards, a series of measures have to be taken such as a safe electronic evaluation by redundant, diverse electronics, functional monitoring, or special monitoring of the contamination of optical components. The safety standards furthermore specify so-called safety levels or safety demand stages by which the achievable safety is classified. Examples for this are SIL in accordance with IEC61508/IEC61511 (safety integrity level) with 1 as the lowest and 4 as the highest level or PL (performance level) according to EN ISO 13849-1 with a "low" toe "high".

In a phase-based time of flight method, also known as a cw measurement method or as iTOF (indirect TOF), the scene is illuminated by amplitude-modulated light of a modulation frequency typically in an order of magnitude of 100 MHz The light returning from the scene is received and is demodulated using the same frequency that is also used for the modulation of the transmitted light (lock-in process). A measured amplitude value results from the demodulation that corresponds to a sampling value of the received signal. At least two sampling values are required for the phase determination of a periodic signal in accordance with the Nyquist criterion. The measurement is therefore carried out using different relative phasings between the signals for the modulation at the transmission site and the demodulation at the reception side. The absolute phase shift between the transmitted signal and the received signal can thus be determined that is caused by the time of flight and this is in turn proportional to the object spacing in the scene.

A phase method, however, only has a limited unambiguity range corresponding to the period of the modulation frequency. Due to the twofold light path, this corresponds to a range of only 1.5 m at a modulation frequency of 100 Mhz. To increase the ambiguity range and thus the range coverage, measurement frequently takes place at a plurality of different modulation frequencies. An alternative lowering of the modulation frequency can only be considered within tight limits because the measurement accuracy is thereby impaired. The measurement at a plurality of modulation frequencies combines a high depth resolution with a large depth measurement range.

If an object is located at a distance outside the unambiguity rage marked by D, there is no possibility due to the principle of deciding whether it is to be associated with the range [0, D), [D, 2D), . . . . This applies to the simple unambiguity range on a measurement at a modulation frequency and equally to the combined unambiguity range of a measurement at a plurality of modulation frequencies. Erroneous measurements can therefore occur if an object is also located at a greater distance outside the actual range coverage of the first unambiguity object [0, D). A simple intensity filter coordinated with the quadratic distance reduction cannot reliably filter such objects, in particular when it is a very bright object or a shiny or even retroreflecting surface. A relevant and confusable signal intensity then remains despite the great distance. This discriminability above all questions a technical safety use since erroneous associations of measured values of remote objects in the near zone can substantially impair the function of the unit or can make it unusable for a use in a technical safety concept.

A very large unambiguity range is theoretically achievable by a suitable selection of modulation frequencies. In practice, with real, noisy signals, however, this does not always result in usable, exact measured results. US 2014/0049767 A1 discloses a method for the geometrical phase unwrapping of a time of flight system that therefore does not actually aim for any maximum unambiguity range; for this case to be overcome in its view, it names the example of two frequencies of 31 MHz and 50 MHz Instead, frequencies are used very directly that are derived from a comparatively large common base frequency a, in particular three frequencies $f_1=am_1$, $f_2=am_2$, and $f_3=am_3$ having small mutually coprime whole numbers $m_1$, $m_2$, $m_3$. By the use of such methods, the unambiguity range is then again in orders of magnitude of, for example, ten or twenty meters in which objects at a spacing outside the unambiguity range can absolutely be of great practical relevance despite the measurement using a plurality of modulation frequencies. However, US 2014/0049767 A1 has no solution for this.

EP 3 736 601 A1 deals with the determination of the distance of an object while taking account of edge hits. The distance is here measured with a phase base using two frequencies. In addition, the respective amplitudes are evaluated that differ at one and the same distance with edge hits of the sensing beam using a respective part cross-section on objects at different distances from full hits of the total cross-section. Except for a mention of the typical approach having a plurality of modulation frequencies, the document does not, however, contribute to the unambiguity range.

An active brightness based strategy for the locating of invalid pixels in time of flight systems is described in US 2018/0210070 A1. It is directed to multipath propagation and motion blur. In a similar manner to EP 3 736 601 A1, the amplitudes are also evaluated here to then set the pixels to "invalid" when these amplitudes allow a conclusion on a mixture of sensed distances. Again, the above-described problem of received signals of an object outside the unambiguity range are not looked at and the possibility of increasing the unambiguity range by a plurality of modulation frequencies is only briefly addressed.

It is therefore the object of the invention to improve distance measurement using a phase based time of flight method This object is satisfied by an optoelectronic device, in particular a light 3D time of flight camera, and by a method for distance measurement in an detection zone using a phase based time of flight method in accordance with the respective independent claim. The time of flight measurement essentially works as was described in the introduction. A transmission device generates a light signal that is modulated at a first modulation frequency $f_1$. It must be stated as a precaution that this is an artificial amplitude modulation at a selected modulation frequency that should not be confused with the carrier frequency of the actual light wave. The transmitted light reflected back from objects in the detection zone is incident superposed with extraneous light or background light on a reception device having at least one reception element that generates a received signal therefrom. It is here in particular an image sensor for the detection of three-dimensional image data having a plurality of light reception elements or pixels that each generator their own received signal for this pixel. No distinction is made between directed reflection and undirected remission or scattering in the light reflected back.

A control and evaluation unit determines the time of flight using a phase method and thus determines a value r for the distance, with an explicit conversion into metric data via the speed of flight not being absolutely necessary. The received signal is demodulated for the phase determination in a lock-in method using the first modulation frequency $f_1$ already used for the transmitted light signal. The demodulation can already be implemented in the light reception element or in the pixels of an image sensor that are then also called TOF pixels (time of flight) or lock-in pixels. A further functionality of the control and evaluation unit can also already be integrated in the reception device, in particular on a common chip. An alternative further processing disposed downstream of the reception device is also possible, for example in an FPGA (field programmable gate array).

In addition to the time of flight measurement, an amplitude evaluation is carried out to find erroneous measurements. The fact that the measured distance is erroneous, and indeed not in the sense of measurement errors, but rather completely different from the real distance could be for different reasons. At least the first amplitude for the at least first modulation frequency $f_1$ is determined from the received signal and evaluated for this purpose.

The invention starts from the basic idea of determining a special erroneous measurement and preferably of also correcting it, namely whether the distance from an object was measured outside a first unambiguity range [0, D). In a little more formal terms, an object is possibly in reality at a distance r+nD, n>1 and was erroneously measured much too close at a distance r. This is a completely different kind of erroneous measurement than multipath propagation or motion blur and its discovery required special measures.

Instead of making measurements at a fixed modulation frequency $f_1$ or in embodiments to be presented later at a plurality of fixed modulation frequencies $f_1$, $f_2$, . . . , the modulation frequency itself is varied during a time of flight measurement. This can be called frequency modulation, but this term is avoided in the following due to the doubling of a frequency modulated modulation frequency and a spread spectrum is used instead. The modulation frequency is anyway varied, scattered, or jittered and this is reflected for reasons to be explained later in a reduced first amplitude. The spread spectrum may also not be confused with a plurality of measures at a plurality of modulation frequencies $f_i$, it is a question of a fast variation within one and the same measurement of a phasing; subsequent measurements using further modulation frequencies $f_i$ can be modified per se again using the same, a different, or no spread spectrum.

The reduction of at least the first amplitude effected by the spread spectrum is evaluated. The effect of the spread spectrum on the first amplitude can be calculated; there is consequently an expectation for this on the first amplitude in the first unambiguity range [0, D) or in more remote distance ranges [D, 2D), [2D, 3D), . . . . A constant or again distance dependent amplitude criterion can be derived from this expectation and the measured time of flight is assigned to the first unambiguity range [0, D) or a more remote distance range [D, 2D), D, 3D), . . . by comparison with the measured first amplitude or a value derived therefrom.

The invention has the advantage that erroneous measurements by objects outside the first unambiguity range are reliably recognized. A distinction can in particular be made between objects in the first unambiguity range [0, D) and in the unambiguity ranges [D, 2D), [2D, 3D), . . . disposed behind it. This does not require any basic changes of the measurement principle, but only an expansion of the modulation from a pure amplitude modulation by a frequency modulation or spread spectrum. The drop of the measured amplitudes resulting from this is accordingly not an interference effect dependent on the measurement situation as would be the case with multipath propagation or motion blur. Additional distance information is rather very directly and reproducibly generated in the amplitudes. The problem of the unambiguity ranges occurs even under ideal measurement conditions; in another sense it is an erroneous measurement as multipath propagation or motion blur and, corresponding to this intrinsic problem of the measurement principle, amplitude information is imparted and evaluated that equally relates to ideal conditions. This does not namely mean that it is not possible and sensible to evaluate the amplitude information so robustly that the correct ambiguity range is also found under real, disturbed measurement conditions.

The erroneous measurements discovered in accordance with the invention are in another respect only erroneous in the first step. Again in contrast with multipath propagation or with motion blur, which error was made can be determined and such measurements therefore do not have to be discarded or pixels do not have to be tagged as invalid, but a new, corrected distance value can rather be assigned. The spread spectrum improves the electromagnetic compatibility (EMC) and coexistence with further similar systems or systems of the same design. This is not the primary goal in connection with the invention, but there are nevertheless synergetic advantages.

The control and evaluation unit is preferably configured to vary the at least first modulation frequency $f_1$ by a monotonic function over the first fluctuation range, in particular a ramp or a sinusoidal sequence. A possibility of stating the spread spectrum formally is a function $\Delta f(t)$ that is added to the modulation frequency. This function is preferably monotonic, at least for a certain time interval to pass through the fluctuation range once or multiple times. Examples for this are a ramp or a sinusoidal sequence that each pass through the fluctuation range once or multiple times from the bottom to the top, from the top to the bottom, or to and fro. The function is preferably offset-free or symmetrically about zero in order not to shift the average or effective modulation frequency or otherwise the new effective modulation frequency should be taken into account in the time of flight determination.

The control and evaluation unit is preferably configured to modulate a light signal having at least a second modulation frequency $f_2$ and to receive it again. The unambiguity range can be expanded by the measurement using a plurality of modulation frequencies and/or the measurement accuracy can be improved, as was discussed in the introduction. The frequencies can preferably be selected in accordance with the teaching of US 2014/0049767 A1 quoted in the introduction, i.e. there is a common base frequency a typically in the range of some to twenty MHz, and the plurality of modulation frequencies are multiples $am_1$, $am_2$, . . . thereof, with coprime, whole number $m_1$, $m_2$, . . . preferably mutually pairwise. The unambiguity range is not necessarily expanded by the phase unwrapping presented in US 2014/0049767 A1. It is conceivable, for example, that the lowest frequency contributes its comparatively large unambiguity range and the other frequencies, in particular the highest frequency, contribute their higher measurement accuracy.

The control and evaluation unit is preferably configured to determine and to evaluate at least a second amplitude from the received signal for the at least second modulation frequency $f_2$. On a measurement using a plurality of modulation frequencies, an associated amplitude is therefore preferably respectively determined and likewise evaluated to find the correct unambiguity range.

The control and evaluation unit is preferably configured to vary the second modulation frequency $f_2$ in a second fluctuation range unequal to the first fluctuation range. Different spread spectra are accordingly used for a plurality of modulation frequencies. With more than two modulation frequencies, spread spectra can repeat or every modulation frequency has its own spread spectrum. Alternatively, the same spread spectrum is used for all the modulation frequencies. The spread spectrum can be understood as absolute or relative. Consequently, a function $\Delta f(t)$ is fixedly predefined or a relative fluctuation range is predefined, for example of some percent of the respective modulation frequency to which the sequence of $\Delta f(t)$ is adapted. It is conceivable that at least one modulation frequency does not experience any spread spectrum. The diversity is to be thought of in practice as the amplitude changes effected by the spread spectrum.

This can absolutely also mean percentage fluctuation ranges that have different effects due to the different associated modulation frequencies.

The control and evaluation unit is preferably configured to evaluate the first amplitude using a distance dependent amplitude loss function $h(r)$ of the ratio of the amplitude using a changed modulation frequency to an amplitude at a constant modulation frequency, in particular the ith amplitude respectively using a distance dependent amplitude loss function $h_i(r)$ per modulation frequency $f_i$. If the amplitude at spread spectrum is designated by $I_{int}$ and the amplitude without spread spectrum by $I_1$, $h(r)=I_{int}(r)/I(r)$ thus indicates just the standardized distance dependent amplitude loss by the spread spectrum. A criterion as to in which unambiguity range a measured distance lies, in particular a threshold, can be derived from the $h(r)$ for a modulation frequency $f_1$ or the $h_i(r)$ for a plurality of modulation frequencies $f_i$. The amplitude loss function is an expectation, the ith amplitude is a respective measured value since a check is made against this expectation to find the matching unambiguity range. The different modulation frequencies $f_i$ are first looked at individually with the amplitude loss function, with a common decision subsequently having to be made in the case of a plurality of modulation frequencies.

The control and evaluation unit is preferably configured to offset the ith amplitudes at a plurality of modulation frequencies $f_i$ with a combination rule with one another and to evaluate it using an amplitude evaluation function $k(r)$ summarized in accordance with the combination rule for all the modulation frequencies $f_i$ used. The amplitude evaluation function $k(r)$ advantageously summarizes the expectation for a plurality of used modulation frequencies, with, as already with $h(r)$, the amplitude evaluation function $k(r)$ itself not having to be the expectation, but rather with a threshold, for example, being able to be derived therefrom. The respective measured ith amplitudes are accordingly combined with one another and thus compared with an expectation in one step. The combination rule links a plurality of input values, as in the case of a sum, with suitable combination rules presently being presented. This can be applied to the amplitude loss functions ($h_i(r)$ and to the measured ith amplitudes.

The combination rule is preferably a ratio or a quotient. This has the advantage that values such as the purely distance dependent, typically quadratically dropping intensity sequence and the remission capability being cut out. Any desired functions in the numerator and denominator, preferably linear combinations or individual amounts, are possible. The combination rule is particularly preferably a ratio or a quotient of a spread and a standardization measure. An exemplary spread is the difference from the maximum and the minimum or the standard deviation or, for a simpler calculation, a sum of squares corresponding to the variance, an exemplary standardization measure is the maximum, the sum, or the mean value.

The combination rule preferably only considers the greatest and/or the smallest modulation frequency. Unlike in the case of imponderable measurement errors that are caused, for instance, by multipath propagation or motion blur, the amplitude loss introduced by the spread spectrum is known and predictable. In particular a maximum or a minimum therefore does not have to be dynamically determined. It is rather known from the start which modulation frequency experiences the greatest and smallest amplitude loss due to the spread spectrum and this is at least unchanged over large distance ranges that cover an unambiguity range. Provided that the same fluctuation width of the spread spectrum is not used for all the modulation frequencies or that the same resulting amplitude losses are effected, this must be taken into account since it can relativize or even reverse the ratios. Due to the known and reproducible amplitude losses, the combination rule can at least be simplified in that, and only very directly, the values at specific modulation frequencies are used and in particular one or some modulation frequencies remain out of consideration in this regard.

The control and evaluation unit is preferably configured to evaluate the amplitude using a threshold. This is a very simple criterion that can be checked with little effort. The threshold is preferably found using the amplitude loss functions $h_i(r)$ or the amplitude evaluation function $k(r)$ and in particular separates the first unambiguity range [0, D) from the more remote unambiguity ranges [D, 2D).

The threshold is preferably a function of the distance. A mathematically still conceivable constant function should be precluded at this point by this formulation; the distance dependent threshold is thus adapted more exactly and enables an even better distinction.

The control and evaluation unit is preferably configured to correct the measured distance of an erroneous measurement by a multiple of the unambiguity range. If it is found using the procedure in accordance with the invention that an object is located at a distance outside the first unambiguity range [0, D), this measurement is preferably not discarded or the respective pixel is tagged as invalid. Instead, the measured value is corrected by the extent D of the unambiguity range, that is the new distance is set to r+nD. The measured ith amplitudes generally even enable the determination of the n>1 so that the correct multiple of the extent D of the unambiguity range could be added. However, in a preferred embodiment, D is simply added to n=1; the measured value is therefore set to r+D. This is the most likely case because objects that are even more remote are hardly still detected even with a very high remission capability due to the quadratically distance dependent intensity drop. It is in any case the conservative assumption in a technical safety application that provides sufficient opportunity with an approach movement to measure the object again at a later point in time, at the latest when it has arrived in the first unambiguity range. The unambiguity range should anyway itself be better expanded for highly precise quantitative measurements over large ranges, for instance by using additional modulation frequencies. If the unambiguity range is at least practically doubled by the invention, this is already a great gain.

The method in accordance with the invention can be further developed in a similar manner and shows similar advantages in so doing. Such advantageous features are described in an exemplary, but not exclusive manner in the subordinate claims dependent on the independent claims.

Figure 2:
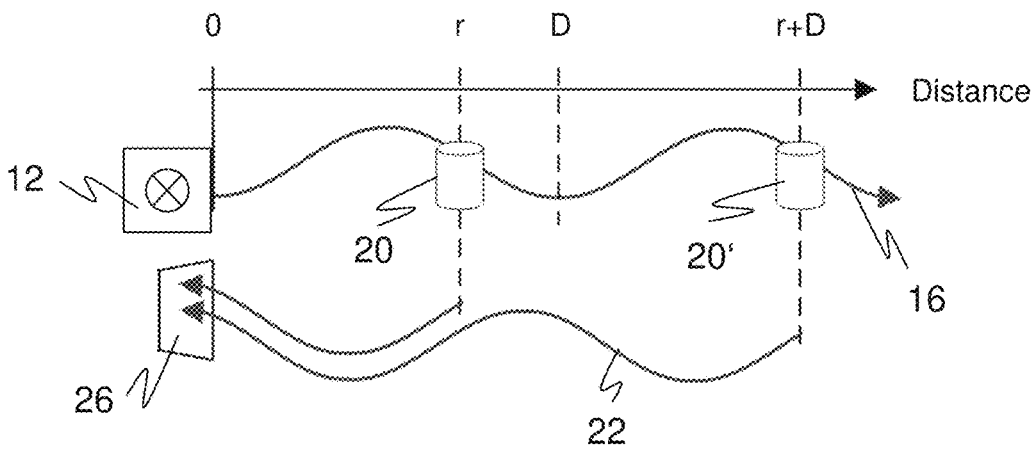
Figure 3:
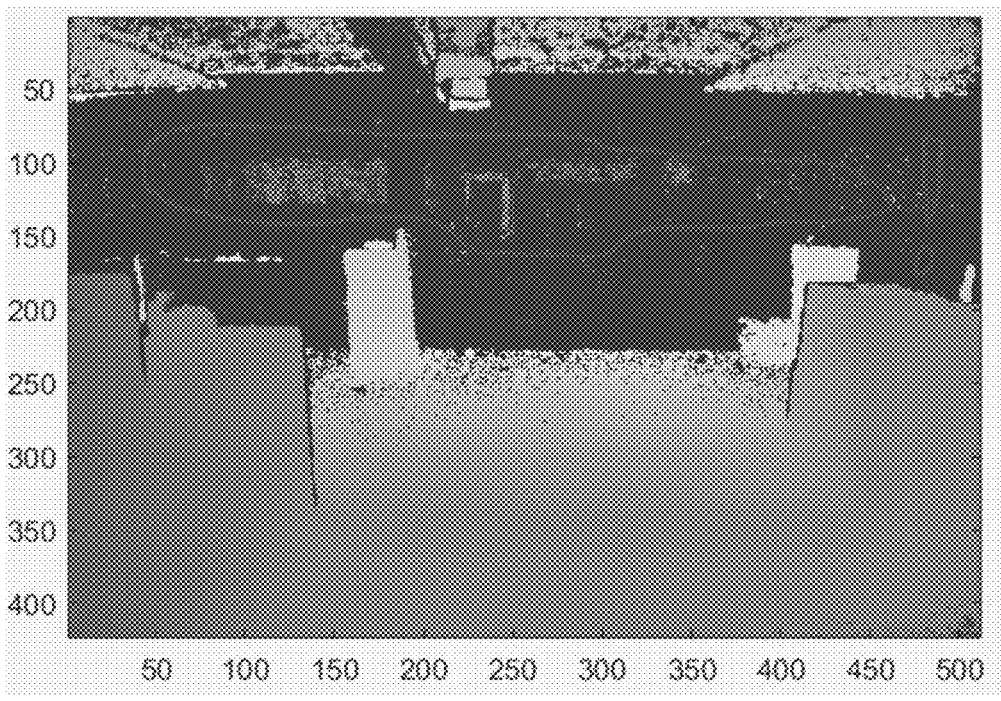
Figure 4:
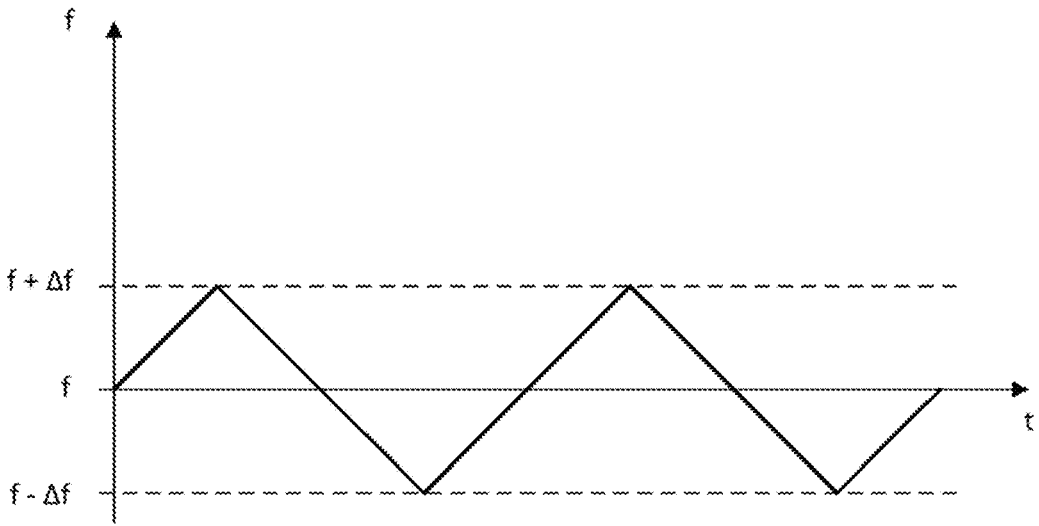
Figure 7:
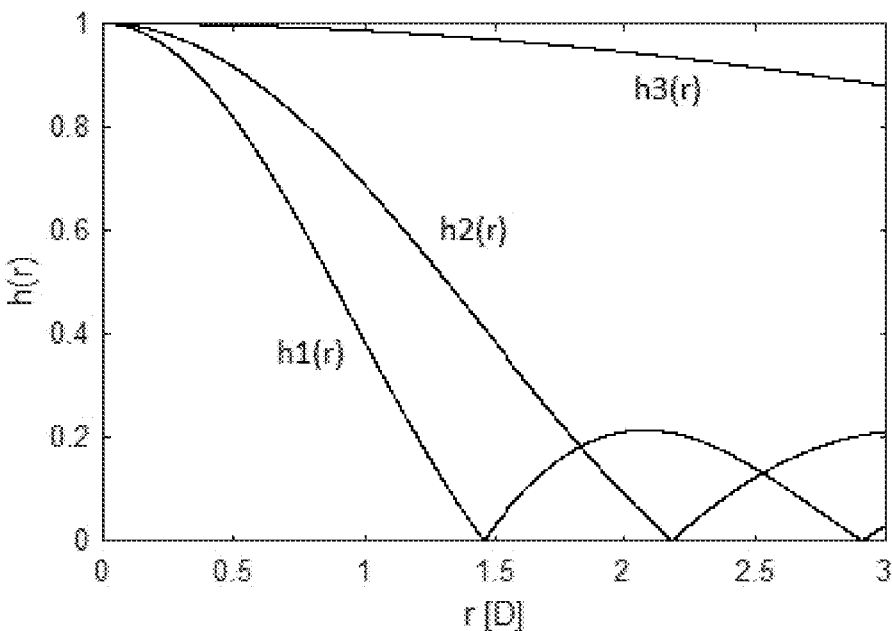
Figure 8:
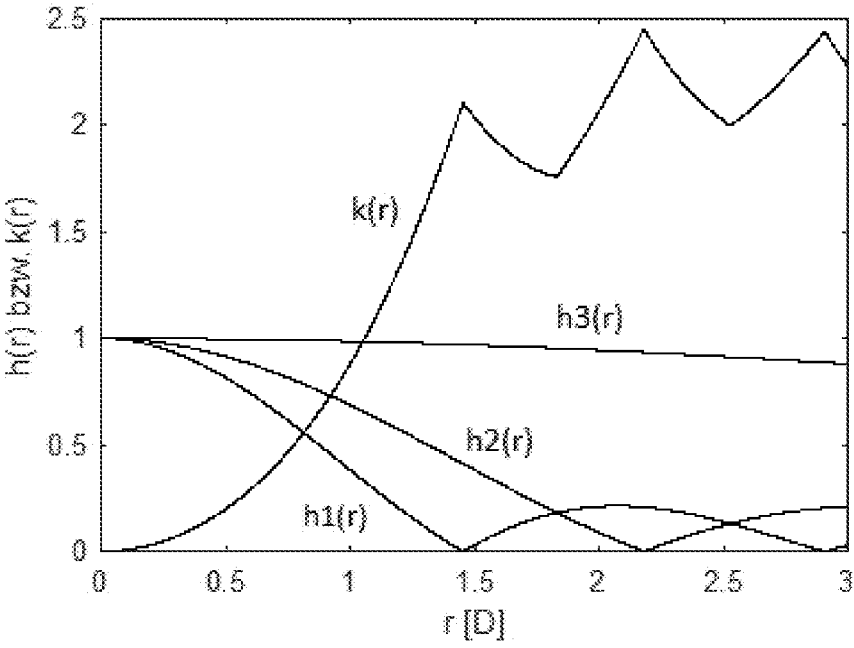
Figure 9:
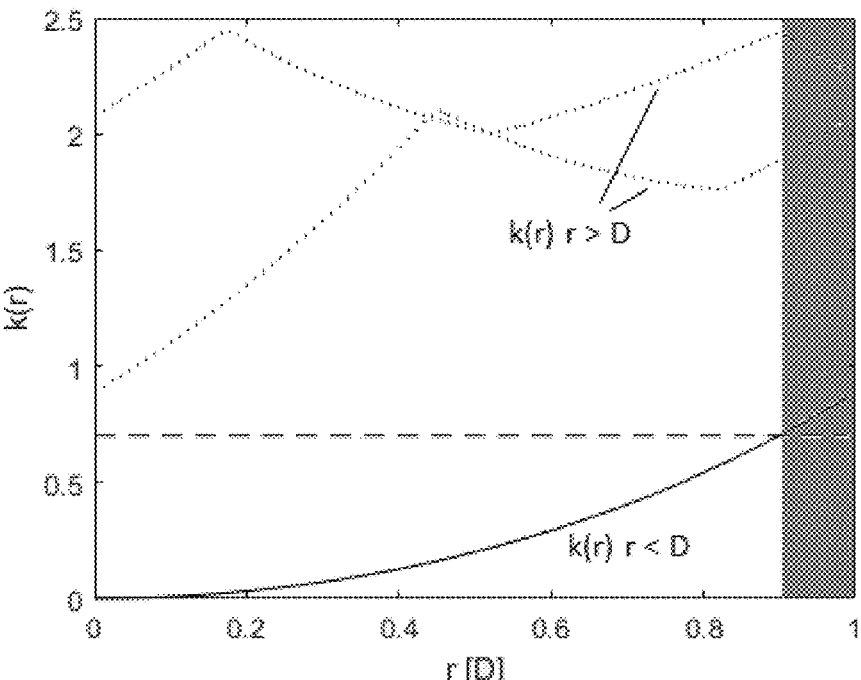
Figure 10:
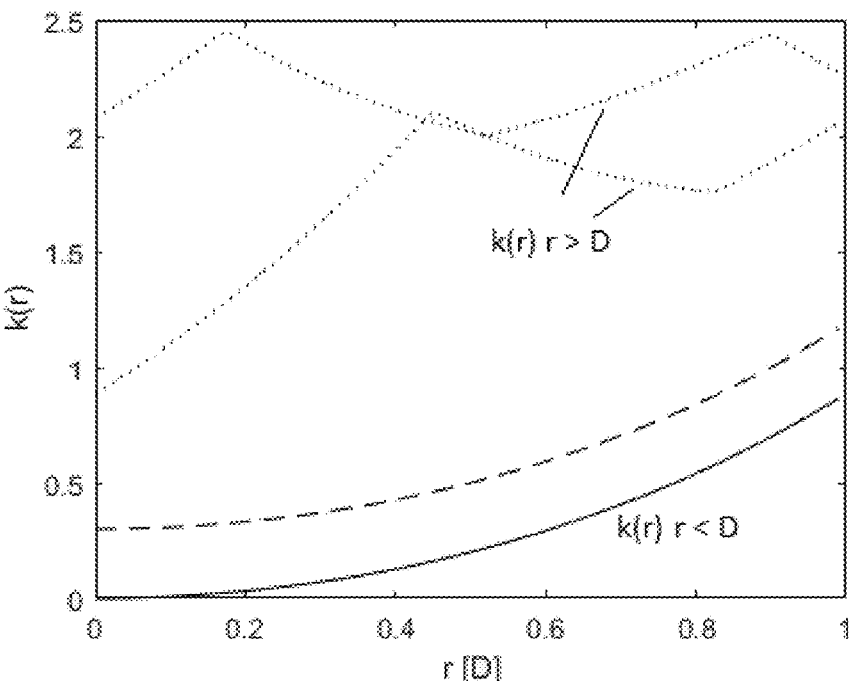
Figure 11:
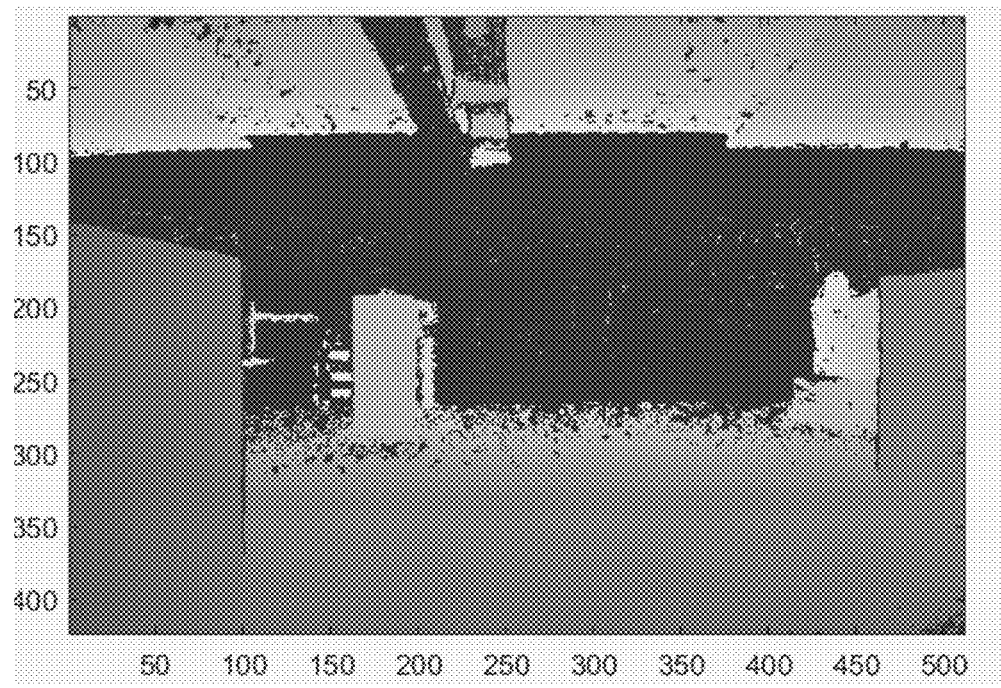

The invention will be explained in more detail in the following also with respect to further features and advantages by way of example with reference to embodiments and to the enclosed drawing. The Figures of the drawing show in:

FIG. 1 a schematic block diagram of a 3D time of flight camera;

FIG. 2 a representation of the distance measurement for an object inside and outside a first unambiguity range;

FIG. 3 an exemplary depth map measured by a 3D time of flight camera with erroneous measurements due to ambiguities;

FIG. 4 an exemplary spread spectrum;

FIGS. 5a-c vector diagrams to illustrate the effects of a spread spectrum of different degrees on the amplitude;

FIG. 6 an exemplary representation of an amplitude loss function h(r) due to a spread spectrum;

FIG. 7 an exemplary representation of a plurality of amplitude loss functions $h_i(r)$ for a plurality of modulation frequencies $f_i$;

FIG. 8 a representation of a summarized amplitude evaluation function k(r) superposed with the amplitude loss function h(r) in accordance with FIG. 7;

FIG. 9 a representation of the amplitude evaluation function k(r) in accordance with FIG. 8, now in a cyclic representation over a plurality of unambiguity ranges and with a constant threshold for the first unambiguity range;

FIG. 10 a representation similar to FIG. 9, but now with a distance dependent threshold; and FIG. 11 the exemplary dept map in accordance with FIG. 3 after correction of the ambiguities.

FIG. 1 shows a schematic block diagram of a camera 10 configured as a 3D time of flight camera. The invention will be explained for the example of the camera 10, but can generally also be used for phase based time of flight methods in different sensors, for example a distance measurement light scanner, a laser scanner having a rotating rotary mirror, or a measuring head, or a solid state laser scanner.

An illumination unit 12 transmits transmitted light 16 modulated by a transmission optics 14 into a detection zone 18. LEDs or lasers in the form of edge emitters or VSCELs can be considered as the light source. The illumination unit 12 is controllable such that the amplitude of the transmitted limit 16 is modulated at a frequency typically in the range of 1 MHz to 1000 MHz The modulation is, for example, sinusoidal or rectangular, at least a periodic modulation.

When the transmitted light 16 is incident on an object in the detection zone 18, a portion of the received light 22 is reflected back to the camera 10 and is guided there through a reception optics 24, for example a single lens or a reception objective, onto an image sensor 26. The image sensor 26 has a plurality of reception elements or reception pixels 26a. The resolution of the image sensor 26 can extend from two or some few up to thousands or millions of reception pixels 26a. The pixel arrangement is typically a matrix so that a lateral spatial resolution results in an X direction and in a Y direction, which is supplemented by the Z direction of the distance measurement to form the three-dimensional image data. This 3D detection is preferably meant when a 3D camera, a 3D time of flight camera, or three-dimensional image data are spoken of. In principle, however, different pixel arrangements are also conceivable; for instance, a pixel row that is selected in a matrix or that forms the whole image sensor of a line scan camera.

The reception pixels 26a each comprise a light sensitive surface and at least one charge store, for example a capacitor. In this respect, a control is made in a lock-in method using a demodulation frequency corresponding to the modulation frequency used for the transmitted light 16 as to when the charges generated by the incident received light 22 are collected in a respective charge store during a measurement period or integration time.

The charge quantities in the charge stores of the reception pixels 26a are read, digitized, and transferred to a control and evaluation unit 28. To acquire additional sampling values for a phase determination, the described part measurement with the collection and reading of charge stores is repeated n times, preferably two to four times. The phase between the modulation frequency used for the transmitted light 16 and the demodulation frequency used for the lock-in method is respectively varied in each case. A plurality of charge stores can replace such part measurements in a certain manner since they already generate a plurality of sampling values within the same part measurement or the charge stores are used for differential measurements by which certain asymmetries in the pixel structure can be compensated, Preferred constellations for the sampling values are measurements using phases 0°, 90°, 180°, and 270° or 0°, 120°, and 240°.

The control and evaluation unit 28 now unwraps the phase offset from the plurality of sampling values on the basis of the time of flight through the detection zone 18 that can be converted into a distance value per reception pixel 26a. A three-dimensional image, distance image, or depth image, that is output at an interface 30, is produced. The interface 30 or, alternatively, one or more further connectors, not shown, conversely serve for the input of control signals or parameterizations of the camera 10.

The division of FIG. 1 into an image sensor 26 having reception pixels 26a that each demodulate themselves and into a control and evaluation unit 28 is only a preferred embodiment. It enables highly integrated image sensors 26 in which the modulation signal for the illumination unit 12, the demodulation signal, and at least part of the further measurement technology is integrated. The control and evaluation unit functionality can, however, also be differently distributed in that, for example, the control and evaluation unit 28 takes care of at least some of the work of a then simpler image sensor 26. The control and evaluation unit 28 also by all means does not have to consist monolithically of a single module, as shown, but can rather be composed of one or more digital computing modules such as microprocessors, FPGAs (field programmable gate arrays) or ASICS (application specific integrated circuits). The illumination shown is furthermore an area illumination, for which purpose, for example, a diffuser is used as part of the transmission optics 14. In another embodiment, an arrangement of a large number of individual light sources of the illumination unit 12 is projected as sharp into the detection zone 18 so that as a result the reception pixels 26a are exposed individually and the range increases. Deviating from the illustration, the illumination can furthermore not be integrated in the camera 10, but are rather separated from them in construction or in space.

FIG. 2 illustrates a distance measurement for an object 20 within a first unambiguity range and an object 20' outside the first unambiguity range by way of example in the second unambiguity range. On a distance measurements, the phase shift φ resulting from the time of flight between the transmitted light 16 and the received light 22 reflected by the object 20, 20' is determined.

$$\varphi = 4\pi f r/c = 2\eta r/D,$$

where $D = c/(2f)$ at the modulation frequency f and the speed of light c.

Due to the $2\pi$ periodicity of the modulation frequency, however, both objects 20, 20' generate the same phase shift at the actually different object distance r and r+D. Generally $$2\pi(d+nD)/D = 2\pi d/D + 2\pi n \equiv \varphi.$$

results for $r = d + n*D$, $n = 0, 1, \ldots$.

The phase measurement consequently only has a limited unambiguity range D or a first unambiguity range [0, D), a second unambiguity range [D, 2D), and further unambiguity ranges. The language is not always completely clear at this point; an unambiguity range that is not further qualified is sometimes used that then means the first unambiguity range [0, D). The unambiguity range can be enlarged by selecting a small modulation frequency f, but only at the cost of a smaller measurement resolution. Measurements are therefore preferably carried out at two to three or more modulation frequencies to increase the unambiguity range in a combination of measurements and/or to obtain a high measurement accuracy. This has already been discussed in the introduction. However, a limited unambiguity range also remains after such measures so that the situation basically continues to be as in FIG. 2.

A distance measurement is typically associated with the first unambiguity range [0, D) where n=0. An object 20' that is further remote normally has only a small signal intensity I and is either not detected at all or can be sorted out by a noise threshold. A sufficient signal intensity in particular remains despite the greater distance with objects 20' having a high remission capability, with shiny surfaces, reflectors, or even retroreflectors. The object 20' is then incorrectly measured at a distance r instead of at the actual distance r+D. That then possibly results in errors in the evaluation of the scene and in a technical safety application possibly in critical errors or at least unnecessary safety related measures. Higher order errors, i.e. where n>1, are likewise conceivable, but the distance dependent intensity drop will usually prevail here.

The explained ambiguity is an intrinsic property of a phase measurement process and is conventionally accepted and the unambiguity range is instead expanded by small and/or a plurality of modulation frequencies by the explained methods. However, this does not prevent the detection of an object 20 outside the resulting first unambiguity range. The procedure in accordance with the invention will be presented in the following to associate the object 20, 20' with the correct unambiguity range or at least to determine whether an object 20, 20' is actually in the first unambiguity range.

FIG. 3 first shows an exemplary false color or gray coded depth map without the correction in accordance with the invention. Circled regions marked by an exclamation mark can be recognized in the background of the scene in which the ambiguity causes an incorrect association in the near zone. This gives the actually remote objects an incorrect significance on a scene evaluation. In a technical safety evaluation with protected fields or the like, this can very likely result in safety relevant shutdowns or other unnecessary securing measures and thus in availability problems.

FIG. 4 shows an exemplary spread spectrum introduced to solve the unambiguity problem. Spread spectrum here means that the illumination unit 12 does not perform modulation of the transmitted light 16 at a fixed frequency f, but rather directly varies, modulates, or jitters this frequency, additionally in a time dependent manner. Conventionally, this procedure is sometimes used for an improved coexistence with other systems or a smaller irradiation at a specific frequency for higher EMC compatibility. The invention can likewise use these advantages, but that is not the effect discussed here. $f(t) = f + \Delta f(t)$ is a conceivable mathematical formulation of the spread spectrum with an additional spread spectrum $\Delta f(t)$. The specific extent of the spread spectrum in FIG. 4 is exemplary.

FIGS. 5a-c illustrate the effects of the spread spectrum. In this respect, FIG. 5a shows the situation without spread spectrum; FIG. 5b with a moderate spread spectrum; and FIG. 5c with a large spread spectrum. The light arrows and the gray shading symbolize the instantaneous signal φ(t); the black arrow symbolizes the time integration thereover and thus the amplitude $I_{int}$ measured therefor. The spread spectrum effects a time modulation of the instantaneous phasing $\varphi(t)$ of the received signal, more precisely: $\varphi(t)=\varphi+\Delta(t)$, where:

$$\Delta\varphi(t)=\varphi(t)-\varphi=4\pi(f(t)-f)^*r/c=4\pi\Delta(t)^*r/c$$

The phase modulation $\Delta\varphi(t)$ is therefore proportional to the frequency deviation $\Delta f(t)$ and to the distance of the object r.

In FIGS. 5a-c, the effects on the instantaneous phasing $\varphi(t)$ and the measurement are shown, i.e. an integration of the received signal over an integration time, in a phase representation. As can be seen, the intensity of the integrated signal $I_{int}$ is reduced in comparison with an intensity I without spread spectrum as in FIG. 5a: $I_{int}<I$ The extent of the amplitude loss is here dependent on the spread spectrum and, as still to be further discussed, on the distance. With a known spread spectrum, an additional distance dependency is thus imparted to the amplitudes that can be used for resolving the periodic ambiguity of the phase measurements or of the association in an unambiguity range. The terms intensity and amplitude are used replaceably at a number of points in this description.

So that the spread spectrum does not change the further evaluation with respect to the underlying modulation frequency, non-modified modulation frequency f, the phasing $\varphi_{int}$ of the signal averaged over the integration time should not change, i.e. $\varphi_{int}=\varphi$ should apply. This can be achieved by a spread spectrum $\Delta f(t)$ that is designed as balanced or symmetrical over the integration time. Examples for suitable spread spectra $\Delta f(t)$ are a ramp or a sinusoidal sequence that run through the fluctuation range opened up by the spread spectrum once or multiple time in one or both directions within the integration time. A ramp running up and down is illustrated as one of these examples in FIG. 4.

FIG. 6 shows an exemplary sequence of the standardized amplitude loss h(r) due to the spread spectrum in dependence on the distance r in units of the unambiguity range D. Without a spread spectrum and in an idealized manner without distorting effects, for example by multipath propagation or motion blur, a distance dependent intensity or amplitude in accordance with $$I(r)=R^*g(r)^*A$$

can be expected. R is here the remission capability of the detected object 20; g(r) the distance dependent intensity loss, typically $$g(r) = \frac{1}{r^2};$$

and A stands tor the remaining dependencies such as the intensity of the irradiated transmitted light 16, the modulation frequency, and the like, that is they should not, for instance, be read as an amplitude, the amplitude is already designated by intensity I.

An additional distance dependent amplitude loss is added for the integrated intensity $I_{int}$ by the spread spectrum:

$$I_{int}(r)=R^*g(r)^*h(r)^*A.$$

The additional distance dependent factor is the amplitude loss function $h(r)=I_{int}(r)/I(r)$ shown in FIG. 6. It indicates the adjusted and standardized distance dependent effect of only the spread spectrum on the amplitude or intensity.

FIG. 7 shows a representation of a plurality of standardized amplitude loss functions $h_i(r)$ for a plurality of modulation frequencies $f_i$. As already mentioned multiple times, a plurality of different measurement frequencies $f_1$, $f_2$, . . . each having their own unambiguity ranges $D_1$, $D_2$, . . . can be used to increase the resulting unambiguity range D by a common evaluation of the measured phasings $\varphi_1$, $\varphi_2$, . . . , and indeed to $D=D_1m_1=D_2m_2=$ . . . , with he whole numbers $m_1$, $m_2$, . . . . . The basic problem, however, remains for the new unambiguity range D. Different objects 20, 20' at a mutual spacing multiple of D generate the same phasing, i.e. for r=d+n*D, n=0, 1, . . . :

$$\frac{2\pi(d + nD_1m_1)}{D_1} = \frac{2\pi d}{D_1} + 2\pi m_1 n \equiv \varphi_1$$

$$\frac{2\pi(d + nD_2m_2)}{D_2} = \frac{2\pi d}{D_2} + 2\pi m_2 n \equiv \varphi_2$$

$$...$$

In accordance with the invention, however, the above described spread spectrum $\Delta f(t)$ is applied to the modulation frequencies $f_1$, $f_2$, . . . . This can be individually selected for every modulation frequency $f_i$. For example, the same spread spectrum is applied to all the modulation frequencies $f_i$ or a separate, different spread spectrum is applied to every modulation frequency $f_i$, or the same and different spread spectra are used for the modulation frequencies $f_i$ in any desired mixed forms. It is also conceivable not to change at least one or exactly one modulation frequency $f_i$ or only to carry out a spread spectrum at all at a modulation frequency $f_i$. However, without a spread spectrum $h_i=1$ for the associated modulation frequency $f_i$, that thus does not contribute anything to an association with the unambiguity range or can only be used as a reference in a quotient formation presented further below. All the modulation frequencies $f_i$ may therefore not remain without spread spectrum; there would then not be any amplitude loss usable for the association with an unambiguity range.

Analogously to the explanations of FIG. 6, $$I_1(r)=R^*g(r)^*A_1$$

$$I_2(r)=R^*g(r)^*A_2$$

. . .

now applies to a plurality of modulation frequencies $f_i$ without spread spectrum with only one modulation frequency f The spread spectrum now adds a distance dependent amplitude loss factor $h_i(r)$ per modulation frequency $f_i$:

$$I_{int,1}(r)=R^*g(r)^*h_1(r)^*A_1$$

$$I_{int,2}(r)=R^*g(r)^*h_2(r)^*A_2$$

. . .

FIG. 7 shows an example of three amplitude loss functions $h_1(r)$, $h_2(r)$, $h_3(r)$ at three modulation frequencies $f_1$, $f_2$, $f_3$. Exemplary numerical values are $f_1=120$ MHz, $f_2=80$ MHz, and $f_3=16$ MHz The unambiguity range D here amounts to 18.75 m corresponding to the three frequencies selected. The modulation frequencies $f_i$ could be selected with smaller common divisors; a greater unambiguity range D would then result as only one doubling with respect to the slowest frequency $f_3$ as in the numerical example. Instead of a maximization of the unambiguity range, a plurality of modulations frequencies $f_1$ are used in this example above all for a higher measurement accuracy and only partly for an enlarged unambiguity range. This adjustment between the unambiguity range and the measurement accuracy can also be carried out differently. A selection of measurement frequencies can advantageously be made for this purpose and an associated phase unwrapping as in US 2014/0049767 A1 can be used. However the unambiguity range D is finally specifically produced, the problem with the period ambiguity results in every case.

FIG. 8 shows the amplitude loss function $h_i(r)$ of FIG. 7 superposed with a summarizing amplitude evaluation function k(r). It would in principle be conceivable to evaluate the respectively measured amplitudes per modulation frequency $f_i$ individually, for instance using a respective criterion that is derived from the amplitude loss functions $h_i(r)$. In this respect, however, dependencies on the remission behavior and other values then remain. The summarizing amplitude evaluation function k(r) that so-to-say takes account of a plurality or all of the modulation frequencies $f_i$ simultaneously is substantially simpler to handle.

The starting point is again formed by the distance dependent integrated intensities per modulation frequency $f_i$ already introduced in FIG. 7:

$$I_{int,1}(r)=R^*g(r)^*h_1(r)$$

$$I_{int,2}(r)=R^*g(r)^*h_2(r)$$

. . .

$A_1=1, A_2=1, . . .$ was assumed here to simplify the further explanation and evaluation This can also be practically achieved by a suitable calibration measurement.

If these integrated intensities are put into relation in suitable combinations, the common terms R and g(r) are abbreviated and a purely distance dependent amplitude evaluation function k(r) given by $h_1(r), h_2(r), . . .$ remains. The example shown in FIG. 8 for the measurement frequencies $f_1, f_2, f_3$ is:

$$k(r) = \frac{\max(I_{int,1}, I_{int,2}, I_{int,3}) - \min(I_{int,1}, I_{int,2}, I_{int,3})}{\text{mean } (I_{int,1}, I_{int,2}, I_{int,3})}.$$

This is in no way the only conceivable amplitude evaluation function k(r), Other amplitude evaluation functions k(r) are preferably similar to the extent that they likewise put a spread into relation with a standardization measure. In this respect, still not exclusively, a sum of squares or a standard deviation could be used in the numerator and a sum or a maximum in the denominator. It is advantageous, but not necessary, to use a spread and a standardization measure. At least a quotient should preferably be formed so that the influence of $R^*g(r)$ is abbreviated. Different linear combinations or only individual intensities can, however, be in the numerator and the denominator in different embodiments.

The intensities or amplitudes actually measured in operation are preferably fully correspondingly offset against one another, that is a quotient is formed from individual intensities, linear combinations or from a spread and a standardization measure, preferably in accordance with the same rule as for the amplitude evaluation function k(r). The ambiguity problem can then be resolved by a comparison between the result of this offsetting of the measured amplitudes with k(r), Whether it is possible to resolve one, a plurality, or all the ambiguities, does not solely depend on the function k(r), but additionally on the achievable measurement accuracy and interference effects such as multipath propagation or motion blur.

Instead of comparing measured amplitudes or values derived therefrom with the amplitude evaluation function k(r) itself, a threshold is preferably fixed for simplifying the evaluation using the amplitude evaluation function k(r). A distinction can thus be made whether an object 20, 20' is in the first unambiguity range [0, D) or at a greater distance r>D.

FIG. 9 shows an example. with a constant threshold, here at 0.7 corresponding to the dashed horizontal line. It is drawn in a representation of the amplitude evaluation function k(r) in accordance with FIG. 8. Unlike in FIG. 8, the representation is cyclic (wrapped around), i.e. the amplitude evaluation function k(r) coming out at the right after the one unambiguity range applied on the X axis then continues to the left again, with the amplitude evaluation function k(r) for the first unambiguity range being shown by a solid line and for the further unambiguity ranges by a dotted line.

The constant threshold separates the first unambiguity range from the further unambiguity ranges disposed therebehind. The gray shaded region is intended to indicate that association problems can arise here due to measurement inaccuracies. In a preferred embodiment, measurements in this gray region will therefore be declared invalid.

FIG. 10 shows a further example having a now distance dependent threshold that is again drawn as a dashed line and having the sequence of the amplitude evaluation function k(r) for a still more distinct association in the first unambiguity range or a further unambiguity range takes place more precisely. FIG. 10 otherwise corresponds to FIG. 9, the gray shaded unsafe marginal region has only been omitted for simplification. The two threshold sequences in FIGS. 9 and 10 are to be understood purely as exemplary and further alternatives are conceivable, for instance piecewise constant thresholds, a plurality of thresholds, and the like.

The measured distances can be corrected by D instead of discarding or declaring invalid distance measurements or pixels that do not satisfy the threshold criterion for the first unambiguity range. The measured value r is replaced with r+D for this purpose. It is in principle conceivable that the actual distance is at r+nD, n>1, but this is, on the one hand, not likely due to the small intensity of such a remote object 20, 20' and in addition it is sufficient for a very large number of application to know that the distance is at least >D. The n can in another respect be determined as required with more complex evaluations than a simple threshold.

FIG. 11 again shows the exemplary depth map in accordance with FIG. 3, but now after correction of the ambiguities in accordance with the invention. The bordered erroneous associations in FIG. 3 are resolved; the association problem is solved by the spread spectrum and by an associated evaluation of the distance dependent amplitude losses caused thereby. At the most, individual incorrectly associated pixels remain that are unremarkable and remain out of consideration by an object segmentation or similar scene evaluation. They in particular do not result in an unnecessary safety relevant response in technical safety applications. Alternatively, individual erroneous pixels could be eliminated by a filter. A high detection sensitivity, measurement accuracy, measurement range, and robustness are thus implemented in technical safety applications, but also in other applications.

Without the procedure in accordance with the invention, it would require at least more complex downstream image evaluation algorithms to resolve erroneous associations of the unambiguity range using object relationships, for example. This is not only laborious, but also in no way always reliably possible without errors or simplifying assumptions. It would also be conceivable to make sure that there are no objects outside the first unambiguity range in the scene, but at least not those with a high remission capability, but such a restriction of the application is unwanted and very difficult to monitor.

The invention claimed is:

1. An optoelectronic device for distance measurement in a detection zone using a phase based time of flight method, the optoelectronic device having a transmitter device for transmitting a light signal that is modulated by at least one first modulation frequency $f_1$, a reception device having at least one light reception element for generating a received signal from the light signal reflected back in the detection zone, and a control and evaluation unit that is configured to determine a phase offset between the transmitted light signal and the light signal reflected back and to determine a time of flight therefrom, and to evaluate a first amplitude determined from the received signal to determine an erroneous measurement, wherein the control and evaluation unit is furthermore configured to recognize an erroneous measurement by reflection of the light signal at an object in the detection zone outside an unambiguity range of the phase based time of flight method in that the first modulation frequency $f_1$ is varied in a first fluctuation range during a time of flight measurement and the first amplitude of the received signal thereby reduced is compared with an expectation of the first amplitude in a first unambiguity range ([0, D)) and/or more distant distance ranges ([D, 2D), [2D, 3D)).

2. The optoelectronic device in accordance with claim 1, wherein the optoelectronic device is a 3D time of flight camera.

3. The optoelectronic device in accordance with claim 1, wherein the control and evaluation unit is configured to vary the at least first modulation frequency $f_1$ by a monotonic function over the first fluctuation range.

4. The optoelectronic device in accordance with claim 3, wherein the monotonic function comprises one of a ramp and a sinusoidal sequence.

5. The optoelectronic device in accordance with claim 1, wherein the control and evaluation unit is configured to modulate a light signal having least a second modulation frequency $f_2$ and to receive it again.

6. The optoelectronic device in accordance with claim 5, wherein the control and evaluation unit is configured to determine and to evaluate at least a second amplitude from the received signal at the at least second modulation frequency $f_2$.

7. The optoelectronic device in accordance with claim 5, wherein the control and evaluation unit is configured to vary the second modulation frequency $f_2$ in a second fluctuation range unequal to the first fluctuation range.

8. The optoelectronic device in accordance with claim 1, wherein the control and evaluation unit is configured to evaluate the first amplitude using a distance dependent amplitude loss function h(r) of the ratio of the amplitude using a changed modulation frequency to an amplitude at a constant modulation frequency.

9. The optoelectronic device in accordance with claim 1, wherein the control and evaluation unit is configured to evaluate the first amplitude using a distance dependent amplitude loss function h(r) of the ratio of the amplitude using a changed modulation frequency to an amplitude respectively using a distance dependent amplitude loss function $h_i(r)$ per modulation frequency $f_i$.

10. The optoelectronic device in accordance with claim 1, wherein the control and evaluation unit is configured to offset ith amplitudes with one another at a plurality of modulation frequencies fi with a combination rule and to evaluate it using an amplitude evaluation function k(r) summarized in accordance with the combination rule for all the modulation frequencies $f_i$ used.

11. The optoelectronic device in accordance with claim 10, wherein the combination rule is a ratio or a quotient.

12. The optoelectronic device in accordance with claim 11, wherein the combination rule a ratio or a quotient of linear combinations or from a spread and a standardization measure.

13. The optoelectronic device in accordance with claim 11, wherein the spread is the difference from a maximum and a minimum or a sum of squares and the standardization measure is a sum or an average value.

14. The optoelectronic device in accordance with claim 11, wherein the combination rule only takes the largest and/or the smallest modulation frequency into account.

15. The optoelectronic device in accordance with claim 1, wherein the control and evaluation unit is configured to evaluate the amplitude using a threshold.

16. The optoelectronic device in accordance with claim 15, wherein the threshold is a function of the distance.

17. The optoelectronic device in accordance with claim 1, wherein the control and evaluation unit is configured to correct the measured distance of an erroneous measurement by a multiple of the unambiguity range.

18. A method for distance measurement in a detection zone using a phase based time of flight method, in which a light signal is transmitted that is modulated by at least one first modulation frequency $f_i$, a received signal is generated from the light signal reflected back in the detection zone, a phase offset is determined between the transmitted light signal and the light signal reflected back and a time of flight is determined therefrom, and furthermore a first amplitude is determined from the received signal and is evaluated to determine an erroneous measurement, wherein an erroneous measurement is recognized by reflection of the light signal at an object in the detection zone outside an unambiguity range of the phase based time of flight method in that the first modulation frequency $f_i$ is varied in a first fluctuation range during a time of flight measurement and the first amplitude of the received signal thereby reduced is evaluated.

19. The method in accordance with claim 18, wherein the method is carried out for detecting three-dimensional image data.

\* \* \* \* \*